(12) United States Patent
Hsia et al.

(10) Patent No.: US 12,742,936 B2
(45) Date of Patent: Sep. 22, 2026

(54) LIGHT GUIDE COLUMN, AND METHOD AND APPARATUS FOR ADJUSTING SIDEWALL STRUCTURE OF CYLINDRICAL LIGHT GUIDE COLUMN

(71) Applicant: Luxshare Precision Industry Company Limited, Shenzhen (CN)

(72) Inventors: Hsi-Sheng Hsia, Shenzhen (CN); Jhih-Li Lin, Shenzhen (CN)

(73) Assignee: LUXSHARE PRECISION INDUSTRY COMPANY LIMITED, Shenzhen (CN)

( * ) Notice: Subject to any disclaimer, the term of this patent is extended or adjusted under 35 U.S.C. 154(b) by 273 days.

(21) Appl. No.: 18/239,864

(22) Filed: Aug. 30, 2023

(65) Prior Publication Data

US 2024/0402439 A1 Dec. 5, 2024

(30) Foreign Application Priority Data

Jun. 2, 2023 (CN) ........................ 202310651823.X

(51) Int. Cl.
*G02B 6/04* (2006.01)
*G02B 6/42* (2006.01)

(52) U.S. Cl.
CPC ......... *G02B 6/4202* (2013.01); *G02B 6/4298* (2013.01)

(58) Field of Classification Search
CPC ........................................................ G02B 6/04
USPC ........................................................ 385/129
See application file for complete search history.

(56) References Cited

U.S. PATENT DOCUMENTS 3,902,056 A * 8/1975 Aizenberg ............ F21V 7/0066 359/597
5,926,658 A 7/1999 Tenmyo
5,953,477 A * 9/1999 Wach .................. G02B 6/4203 385/115

(Continued)

FOREIGN PATENT DOCUMENTS

CN 1209892 A * 3/1999 ............... G06K 7/14
CN 102893138 A * 1/2013 ................ G01J 3/51

(Continued)

OTHER PUBLICATIONS

Chinese Office Action and Search Report for Chinese Application No. 202310651823.X, dated Jul. 30, 2025, with English translation.

*Primary Examiner* — Kaveh C Kianni
(74) *Attorney, Agent, or Firm* — Birch, Stewart, Kolasch & Birch, LLP

(57) ABSTRACT

Provided are a method and apparatus for adjusting a sidewall structure of a cylindrical light guide column, where the method includes: acquiring a size parameter of a light guide column; calculating, based on the law of refraction, a total internal reflection angle of the light guide column according to a light guide column refractive index and an air refractive index, and calculating, in conjunction with an incidence angle of an incident light, a refraction angle of a refracted light; acquiring a first inclination angle range of a sidewall of the light guide column according to the refraction angle and the total internal reflection angle; and adjusting the sidewall of the light guide column according to the first inclination angle range to form a first inclination surface to enable the refracted light to be totally reflected on the first inclination surface.

7 Claims, 11 Drawing Sheets

(56) References Cited

U.S. PATENT DOCUMENTS 6,174,424 B1 * 1/2001 Wach ................. G01N 21/7703 205/79
6,563,567 B1 * 5/2003 Komatsuda ......... G03F 7/70108 355/71
2002/0064341 A1 * 5/2002 Fauver ................. G02B 6/3502 359/210.1
2004/0042233 A1 * 3/2004 Suzuki ................. G02B 6/0038 362/606
2007/0237453 A1 * 10/2007 Nielsen .................. G02B 6/262 385/28
2013/0155723 A1 * 6/2013 Coleman .............. G02B 6/0028 362/621
2014/0268802 A1 * 9/2014 Sun ......................... F21K 9/232 362/331
2018/0011324 A1 * 1/2018 Popovich ............. G02B 6/0076
2018/0188544 A1 * 7/2018 Gross ..................... G02B 6/255
2018/0214951 A1 * 8/2018 Koponen ............. B23K 26/073
2018/0217324 A1 * 8/2018 Brown ................. B23K 26/067
2019/0008388 A1 * 1/2019 Ando ..................... G02B 21/16
2019/0162379 A1 * 5/2019 Stormberg ............... B60Q 1/04
2019/0389364 A1 * 12/2019 Shah ..................... F21S 43/315
2023/0152283 A1 * 5/2023 Fogwill .................. G01N 30/74 210/198.2

FOREIGN PATENT DOCUMENTS

CN 208255457 U 12/2018
CN 109145468 A 1/2019
CN 116027477 A 4/2023
CN 116594176 A * 8/2023 ........... G02B 6/4298
JP 4422432 B2 * 2/2010 ......... G02B 17/0816
JP 2022-132850 A 9/2022
TW 200951560 A1 12/2009

* cited by examiner

LIGHT GUIDE COLUMN, AND METHOD AND APPARATUS FOR ADJUSTING SIDEWALL STRUCTURE OF CYLINDRICAL LIGHT GUIDE COLUMN

CROSS-REFERENCE TO RELATED APPLICATION(S)

This application claims priority to Chinese Patent Application No. 202310651823X filed Jun. 2, 2023, the disclosure of which is incorporated herein by reference in its entirety.

TECHNICAL FIELD

The present disclosure relates to the field of optical technology and in particular, to a light guide column and a method and apparatus for adjusting a sidewall structure of a cylindrical light guide column.

BACKGROUND

At present, with the development of science and technology, photosensitive sensors have been applied in various industries, such as smart doorbells, smart displays, mobile phones, and external remote controls. The photosensitive sensors obtain the information that needs to be obtained through light perception. Since the photosensitive sensors are installed in the structure of the preceding devices, light transmission is limited to the structure of these devices, and light needs to be transmitted through light guide columns.

At present, most of the light guide columns are made of cylindrical plastic materials of a uniform size. Due to the difference in refractive indices of two different media materials, light entering one medium is totally reflected by a light guide column medium under the premise that the conditions are met. Through the simple cylindrical shape, the light is totally reflected repeatedly and then transmitted to a conductor located below:

However, there is a problem: after the incidence angle of the incident light is changed, for example, when the angle of the incident light is increased, the intensity of the light that the photosensitive sensor can receive is greatly reduced in a cylindrical light guide column, as shown in FIG. 1. When the incidence angle of the incident light is about 35 degrees, the light transmission efficiency of the light guide column is reduced to about 50% of the original light intensity. When the incidence angle of the incident light is greater than 60 degrees, the light transmission efficiency of the light guide column is less than 10% and approaches 0%.

SUMMARY

Embodiments of the present disclosure provide a light guide column and a method and apparatus for adjusting a sidewall structure of a cylindrical light guide column to solve the problem in the related art that the light transmission efficiency of a cylindrical light guide column is rapidly reduced as the incidence angle is increased.

To solve the preceding problem, a first aspect of the present disclosure provides a method for adjusting a sidewall structure of a cylindrical light guide column. The method includes the steps described below.

A size parameter of a light guide column is acquired, where the size parameter includes: a light incident surface diameter, a light exit surface diameter, a light guide column height, a light guide column refractive index, and an incidence angle of an incident light.

Based on the law of refraction, a total internal reflection angle of the light guide column is calculated according to the light guide column refractive index and an air refractive index, and a refraction angle of a refracted light that is refracted by a light incident surface of the light guide column is calculated in conjunction with the incidence angle of the incident light.

In a case where the complementary angle of the refraction angle is less than the total internal reflection angle, a first inclination angle range of a sidewall of the light guide column is acquired according to the refraction angle and the total internal reflection angle.

A position at which a marginal light of the light guide column is first incident on the sidewall of the light guide column after refracted by the light incident surface is calculated based on the refraction angle and the light incident surface diameter, where the position is denoted as a first position.

In a direction from the first position to the bottom surface of the light guide column, the sidewall of the light guide column is adjusted according to the first inclination angle range to form a first inclination surface to enable the refracted light to be totally reflected on the first inclination surface.

Optionally, in a case where the complementary angle of the refraction angle is greater than or equal to the total internal reflection angle, the method further includes the step described below:

In the direction from the first position to the bottom surface of the light guide column, the sidewall of the light guide column is adjusted according to a first included angle between a first connection line formed by connecting a target light exit point of a light exit surface of the light guide column and the first position and the sidewall of the light guide column to form a second inclination surface to enable the refracted light to be totally reflected on the second inclination surface and hit the target light exit point.

Optionally, after the sidewall of the light guide column is adjusted in the direction from the first position to the bottom surface of the light guide column according to the first inclination angle range to form the first inclination surface, the method further includes the steps described below:

A position at which the marginal light of the light guide column is first incident on the first inclination surface after refracted by the light incident surface is calculated based on the refraction angle and the light incident surface diameter, where the position is denoted as a second position.

In a direction from the second position to the bottom surface of the light guide column, the sidewall of the light guide column is adjusted according to a second included angle between a second connection line formed by connecting the target light exit point of the light exit surface of the light guide column and the second position and the first inclination surface to form a third inclination surface to enable the refracted light to be totally reflected on the third inclination surface and hit the target light exit point.

Optionally, in the direction from the first position to the bottom surface of the light guide column, the method includes the steps described below.

In a case where the first position is located above the middle height of the light guide column and is close to the light incident surface of the light guide column, in a direction from the first position to the light incident surface of the light guide column, the sidewall of the light guide column is adjusted by inclining the sidewall from the first position in a direction facing the center axis of the light guide column to form a circular table.

In a case where the first position is located below the middle height of the light guide column and is close to the light exit surface of the light guide column, in a direction from the light incident surface to the first position of the light guide column, the sidewall of the light guide column is adjusted by increasing the diameter of the light guide column in a direction away from the center axis of the light guide column.

Optionally, the step where the first inclination angle range of the sidewall of the light guide column is acquired according to the refraction angle and the total internal reflection angle includes the steps described below.

The complementary angle of the refraction angle is acquired based on the refraction angle.

A difference between the complementary angle of the refraction angle and the total internal reflection angle is taken as the minimum inclination angle in the first inclination angle range.

Optionally, the step where the sidewall of the light guide column is adjusted in the direction from the first position to the bottom surface of the light guide column according to the first included angle between the first connection line and the sidewall of the light guide column to form the second inclination surface includes the steps described below.

In a case where the first included angle is less than the refraction angle, a difference between the first included angle and the refraction angle is taken as the inclination angle of the second inclination surface, and the second inclination surface is inclined in the direction facing the center axis of the light guide column.

In a case where the first included angle is greater than the refraction angle, the complementary angle of the first included angle is greater than the total internal reflection angle and the complementary angle of the refraction angle is greater than the total internal reflection angle, a difference between the complementary angle of the refraction angle and the complementary angle of the first included angle is taken as the inclination angle of the second inclination surface, and the second inclination surface is inclined in the direction away from the center axis of the light guide column.

In a case where the first included angle is greater than the refraction angle, the complementary angle of the first included angle is less than the total internal reflection angle and the complementary angle of the refraction angle is greater than the total internal reflection angle, a difference between the complementary angle of the refraction angle and the total internal reflection angle is taken as the inclination angle of the second inclination surface, and the second inclination surface is inclined in the direction away from the center axis of the light guide column.

In a case where the first included angle is greater than the refraction angle, the complementary angle of the first included angle is less than the total internal reflection angle and the complementary angle of the refraction angle is equal to the total internal reflection angle or in a case where the first included angle is equal to the refraction angle, no adjustment is performed.

Optionally, the step where the sidewall of the light guide column is adjusted in the direction from the second position to the bottom surface of the light guide column according to the second included angle between the second connection line and the first inclination surface to form the third inclination surface includes the steps described below:

In a case where the second included angle is less than the complementary angle of the reflection angle of the refracted light on the first inclination surface and greater than an included angle between the first inclination surface and the sidewall and the reflection angle of the refracted light on the first inclination surface is greater than or equal to the total internal reflection angle, a difference between the complementary angle of the reflection angle of the refracted light on the first inclination surface and the second included angle is taken as the inclination angle of the third inclination surface, and the third inclination surface is inclined in the direction facing the center axis of the light guide column.

In a case where the second included angle is greater than the complementary angle of the reflection angle of the refracted light on the first inclination surface and less than the complementary angle of the total internal reflection angle and the reflection angle of the refracted light on the first inclination surface is greater than the total internal reflection angle, a difference between the reflection angle of the refracted light on the first inclination surface and the second included angle is taken as the inclination angle of the third inclination surface, and the third inclination surface is inclined in the direction away from the center axis of the light guide column.

In a case where the second included angle is greater than the complementary angle of the reflection angle of the refracted light on the first inclination surface and greater than the complementary angle of the total internal reflection angle and the reflection angle of the refracted light on the first inclination surface is greater than the total internal reflection angle, a difference between the reflection angle of the refracted light on the first inclination surface and the total internal reflection angle is taken as the inclination angle of the third inclination surface, and the third inclination surface is inclined in the direction away from the center axis of the light guide column.

In a case where the second included angle is greater than the complementary angle of the reflection angle of the refracted light on the first inclination surface and greater than or equal to the complementary angle of the total internal reflection angle and the reflection angle of the refracted light on the first inclination surface is equal to the total internal reflection angle, in a case where the second included angle is equal to the complementary angle of the reflection angle of the refracted light on the first inclination surface or in a case where the second included angle is greater than the included angle between the first inclination surface and the sidewall, no adjustment is performed.

To solve the preceding problem, a second aspect of the present disclosure provides an apparatus for adjusting a sidewall structure of a cylindrical light guide column. The apparatus includes an acquisition module, a first calculation module, a second calculation module, a third calculation module, and an execution module.

The acquisition module is configured to acquire a size parameter of a light guide column, where the size parameter includes: a light incident surface diameter, a light exit surface diameter, a light guide column height, a light guide column refractive index, and an incidence angle of an incident light.

The first calculation module is configured to calculate, based on the law of refraction, a total internal reflection angle of the light guide column according to the light guide column refractive index and an air refractive index, and calculate, in conjunction with the incidence angle of the incident light, a refraction angle of a refracted light that is refracted by a light incident surface of the light guide column.

The second calculation module is configured to acquire, in a case where the complementary angle of the refraction angle is less than the total internal reflection angle, a first inclination angle range of a sidewall of the light guide column according to the refraction angle and the total internal reflection angle.

The third calculation module is configured to calculate, based on the refraction angle and the light incident surface diameter, a position at which a marginal light of the light guide column is first incident on the sidewall of the light guide column after refracted by the light incident surface, where the position is denoted as a first position.

The execution module is configured to adjust, in a direction from the first position to the bottom surface of the light guide column, the sidewall of the light guide column according to the first inclination angle range to form a first inclination surface to enable the refracted light to be totally reflected on the first inclination surface.

To solve the preceding problem, a third aspect of the present disclosure provides a light guide column which is based on a cylindrical light guide column. The light guide column includes a light incident surface, a light exit surface and a sidewall, and the sidewall is adjusted based on the method for adjusting a sidewall structure of a cylindrical light guide column provided by any one of the embodiments of the present disclosure.

The embodiments of the present disclosure provide a light guide column and a method and apparatus for adjusting a sidewall structure of a cylindrical light guide column. The method includes: acquiring a size parameter of a light guide column, where the size parameter includes: a light incident surface diameter, a light exit surface diameter, a light guide column height, a light guide column refractive index, and an incidence angle of an incident light: calculating, based on the law of refraction, a total internal reflection angle of the light guide column according to the light guide column refractive index and an air refractive index, and calculating, in conjunction with the incidence angle of the incident light, a refraction angle of a refracted light that is refracted by a light incident surface of the light guide column: acquiring, in a case where the complementary angle of the refraction angle is less than the total internal reflection angle, a first inclination angle range of a sidewall of the light guide column according to the refraction angle and the total internal reflection angle: calculating, based on the refraction angle and the light incident surface diameter, a position at which a marginal light of the light guide column is first incident on the sidewall of the light guide column after refracted by the light incident surface, where the position is denoted as a first position; and adjusting, in a direction from the first position to the bottom surface of the light guide column, the sidewall of the light guide column according to the first inclination angle range to form a first inclination surface to enable the refracted light to be totally reflected on the first inclination surface. Therefore, as the incidence angle is increased, the incidence angle at which the refracted light is incident onto the sidewall may be changed by changing the shape of the sidewall of the cylindrical light guide column to enable the refracted light to be totally reflected on the sidewall, thereby reducing optical energy loss and improving light transmission efficiency.

It is to be understood that the contents described in this part are not intended to identify key or important features of the embodiments of the present disclosure and are not intended to limit the scope of the present disclosure. Other features of the present disclosure will become readily apparent from the description hereinafter.

BRIEF DESCRIPTION OF DRAWINGS

To illustrate solutions in embodiments of the present disclosure more clearly, the drawings used in the description of the embodiments will be briefly described below. Apparently, the drawings described below illustrate part of embodiments of the present disclosure, and those of ordinary skill in the art may obtain other drawings without any creative work on the basis of the drawings described below.

DETAILED DESCRIPTION

The solutions in embodiments of the present disclosure will be described clearly and completely in conjunction with the drawings in the embodiments of the present disclosure for the purpose of enabling those skilled in the art to better understand the solutions. Apparently, the embodiments described below are part, not all, of the embodiments of the present disclosure. All other embodiments obtained by those of ordinary skill in the art without any creative work on the basis of the embodiments described herein shall be within the scope of the present disclosure.

It is to be noted that the terms "first", "second" and the like in the description, claims and drawings of the present disclosure are used to distinguish between similar objects and are not necessarily used to describe a particular order or sequence. It is to be understood that the data so used is interchangeable under appropriate circumstances such that the embodiments of the present disclosure described herein are capable of operation in sequences other than those illustrated or otherwise described herein. In addition, the terms “comprise”, “include” or any other variation thereof are intended to cover a non-exclusive inclusion, such that a process, method, system, article, or device that contains a list of steps or units is not necessarily limited to those steps or units expressly listed herein but may include other steps or units not expressly listed or inherent to such process, method, article, or device.

Figure 1:
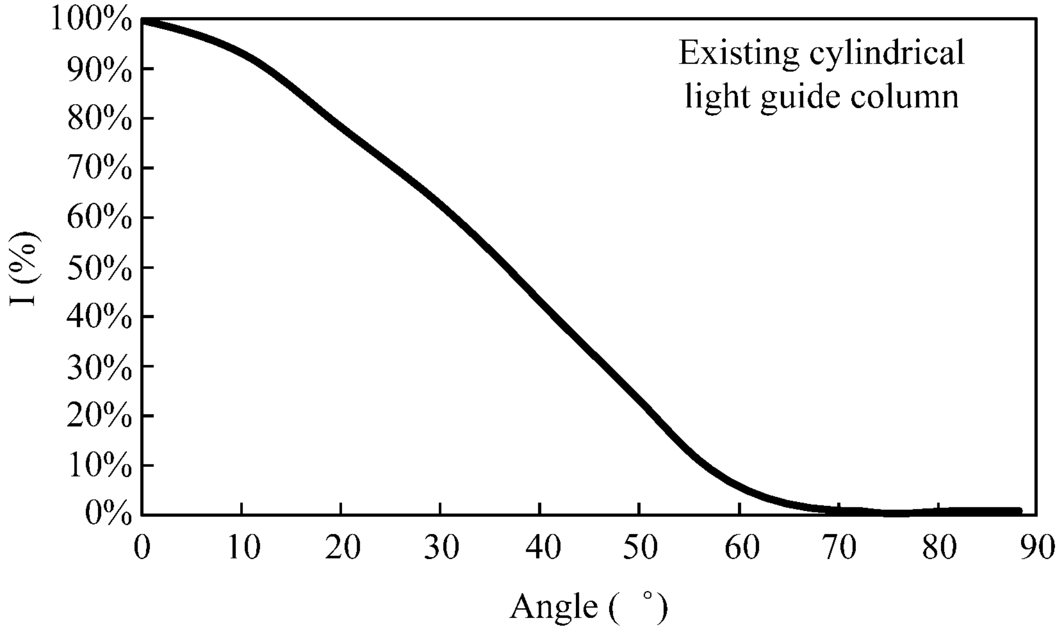
FIG. 1 is a schematic diagram of the change in the light transmission efficiency of a cylindrical light guide column with the change in the incidence angle in the related art.
Figure 2:
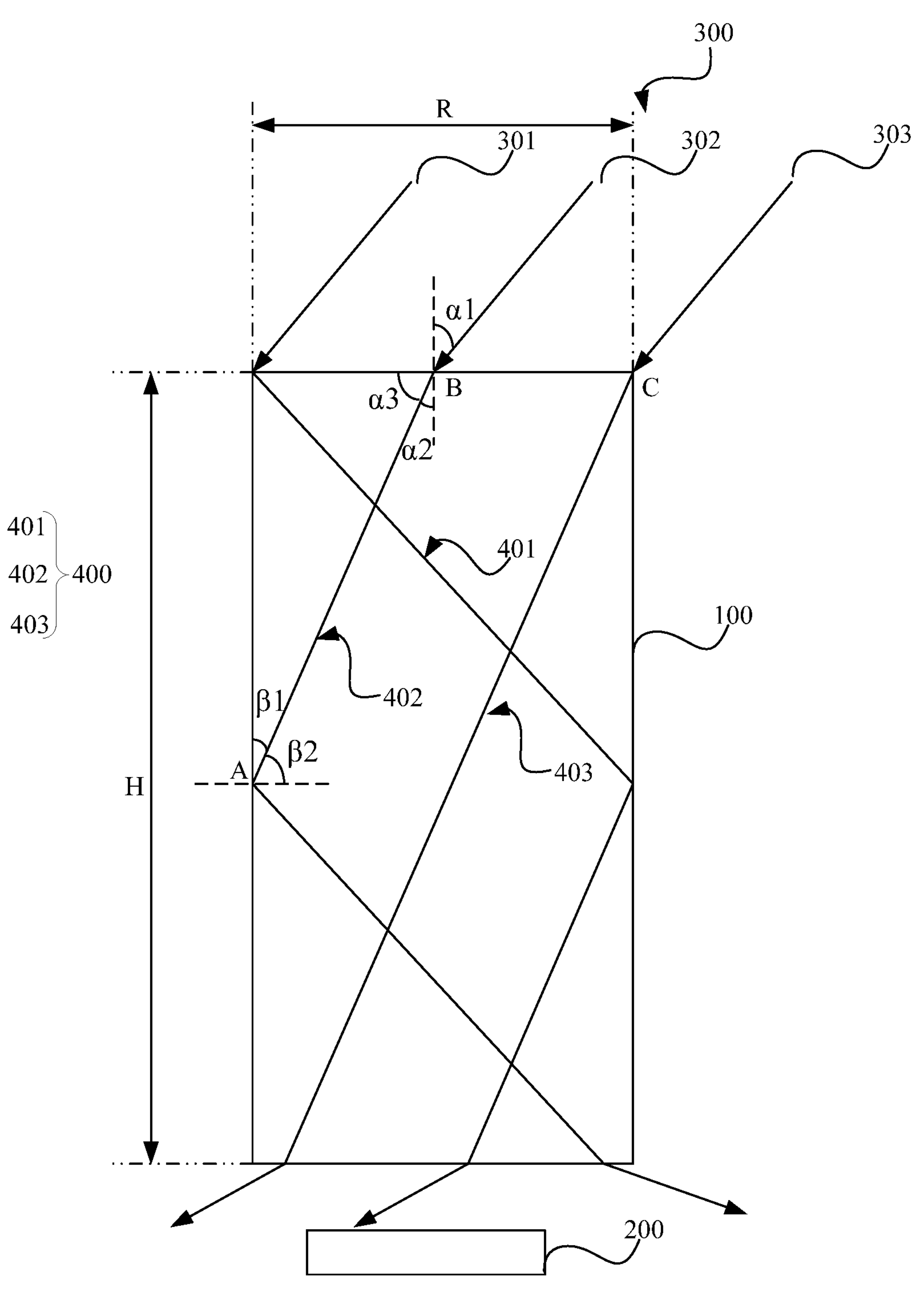
FIG. 2 is a structure diagram of a cylindrical light guide in the related art.

FIG. 1 is a schematic diagram of the change in the light transmission efficiency of a cylindrical light guide column with the change in the incidence angle in the related art. FIG. 2 is a structure diagram of a cylindrical light guide in the related art. As shown in FIG. 2, the cylindrical light guide column 100 (hereinafter referred to as a light guide column 100) is configured to direct the incident light 300 onto a photosensitive element 200 (an infrared sensor or an ambient light sensor). As the incidence angle $\alpha 1$ of the incident light 300 is increased, more light is reflected on the light incident surface of the light guide column 100, and the quantity of light entering the column of the light guide column 100 becomes lower. As the incidence angle $\alpha 1$ of the incident light 300 is increased, the refraction angle $\alpha 2$ is increased, and the incidence angle $\beta 2$ of the refracted light 400 on the sidewall is reduced. When the incidence angle $\beta 2$ of the refracted light 400 on the sidewall is reduced to an angle which is less than a total internal reflection angle (critical angle) of the light guide column 100, the refracted light 400 is refracted on the sidewall, and the quantity of light entering the column of the light guide column 100 is further reduced. The light emitted to the photosensitive element 200 cannot arrive on the photosensitive element 200 due to the increase in the fold angle, causing invalid emitted light. Therefore, the light transmission efficiency (a ratio of the light intensity received on the photosensitive element 200 to the light intensity received on the light incident surface of the light guide column 100) of the light guide column 100 is reduced.

The problem of the increase in the incidence angle $\alpha 1$ of the incident light 300 can be solved by adjusting the internal structure of the product itself (for example, by changing the placement position of the light guide column 100) to reduce the incidence angle $\alpha 1$. If the above problem cannot be solved by adjusting the internal structure of the product itself, the light transmission efficiency of the light guide column can be improved using a method for adjusting a sidewall structure of a cylindrical light guide column provided by an embodiment of the present disclosure.

With continued reference to FIG. 2, the incident light 300 includes a left-edge incident light 301, a middle incident light 302 and a right-edge incident light 303, and the refracted light 400 includes a refracted light 401 of the left-edge incident light 301, a refracted light 402 (for example, the refracted light 402 which is incident on the point A on the sidewall) of the middle incident light 302 and a refracted light 403 of the right-edge incident light 303 (for example, a light which is incident from the point C). The reference numbers when presented below have the same meaning as the reference numbers in this part.

Figure 3:
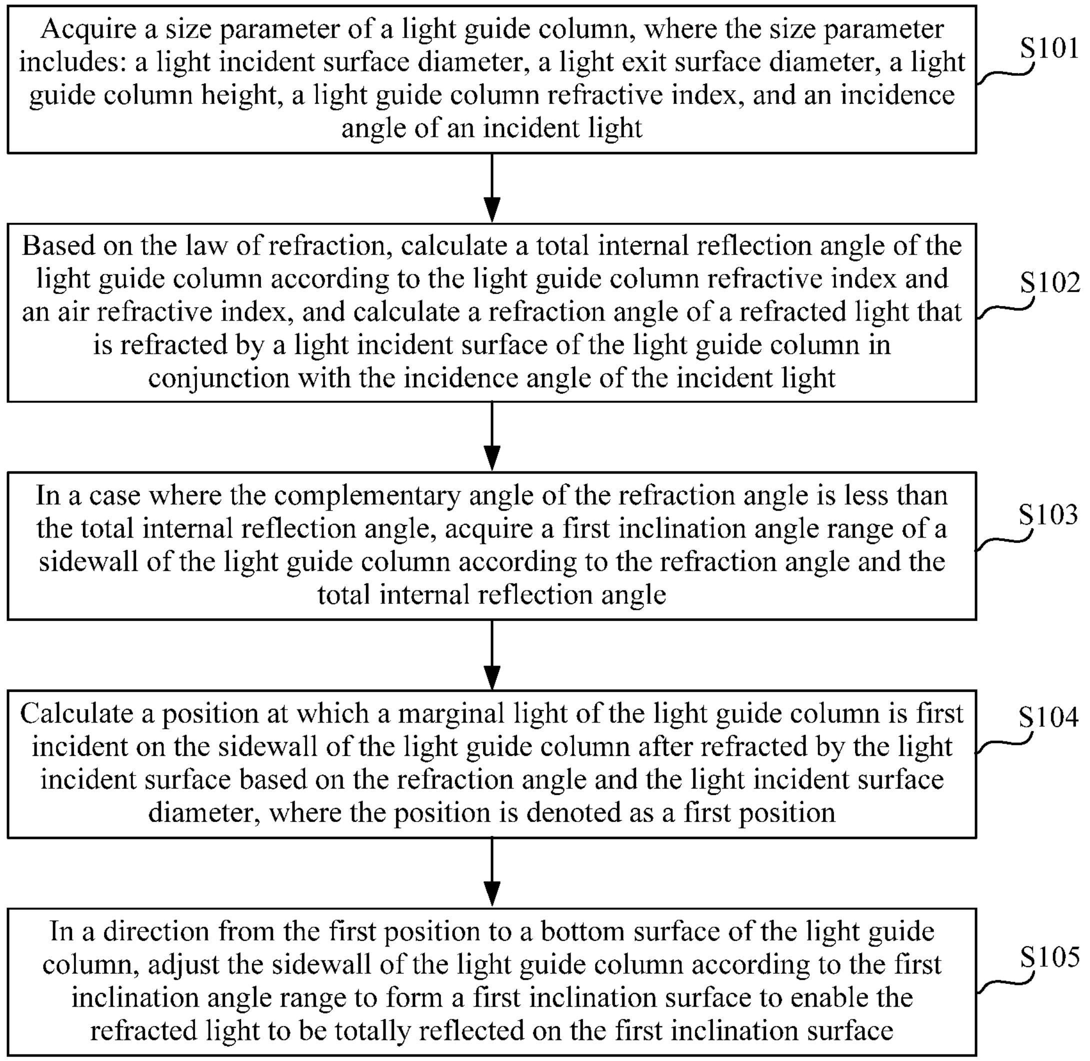
FIG. 3 is a flowchart of a method for adjusting a sidewall structure of a cylindrical light guide column according to an embodiment of the present disclosure.

FIG. 3 is a flowchart of a method for adjusting a sidewall structure of a cylindrical light guide column according to an embodiment of the present disclosure. As shown in FIGS. 2 and 3, the adjustment method includes steps S101 to S105.

In S101, a size parameter of a light guide column is acquired, where the size parameter includes: a light incident surface diameter, a light exit surface diameter R, a light guide column height H, a light guide column refractive index n1, and an incidence angle $\alpha 1$ of an incident light 300.

The light incident/exit surface diameter R and the light guide column height H may be measured by a length measuring device (a vernier caliper or other tools), and the light guide column refractive index n1 and the incidence angle $\alpha 1$ of the incident light 300 may be set according to the design requirements.

In S102, based on the law of refraction, a total internal reflection angle of the light guide column 100 is calculated according to the light guide column refractive index n1 and an air refractive index n2, and a refraction angle $\alpha 2$ of a refracted light 400 that is refracted by a light incident surface 500 of the light guide column 100 is calculated in conjunction with the incidence angle $\alpha 1$ of the incident light 300.

$n2 \sin \alpha 1 = n1 \sin \alpha 2$. When the incidence angle $\alpha 1$ is 90 degrees and the air refractive index n2 is equal to 1, the calculated refraction angle $\alpha 2$ is a critical angle, that is, the total internal reflection angle.

In S103, in a case where the complementary angle $\alpha 3$ of the refraction angle $\alpha 2$ is less than the total internal reflection angle, a first inclination angle range of a sidewall of the light guide column 100 is acquired according to the refraction angle $\alpha 2$ and the total internal reflection angle.

It is to be understood that as shown in FIG. 2, in the cylindrical light guide column 100, the complementary angle $\alpha 3$ of the refraction angle $\alpha 2$ is an incidence angle $\beta 2$ of the refracted light 400 on the sidewall. When the complementary angle $\alpha 3$ of the refraction angle $\alpha 2$ is less than the total internal reflection angle, that is, when the incidence angle $\beta 2$ of the refracted light 400 on the sidewall is less than the total internal reflection angle, the refracted light 400 is refracted on the sidewall, causing light leakage on the sidewall.

Figure 4:
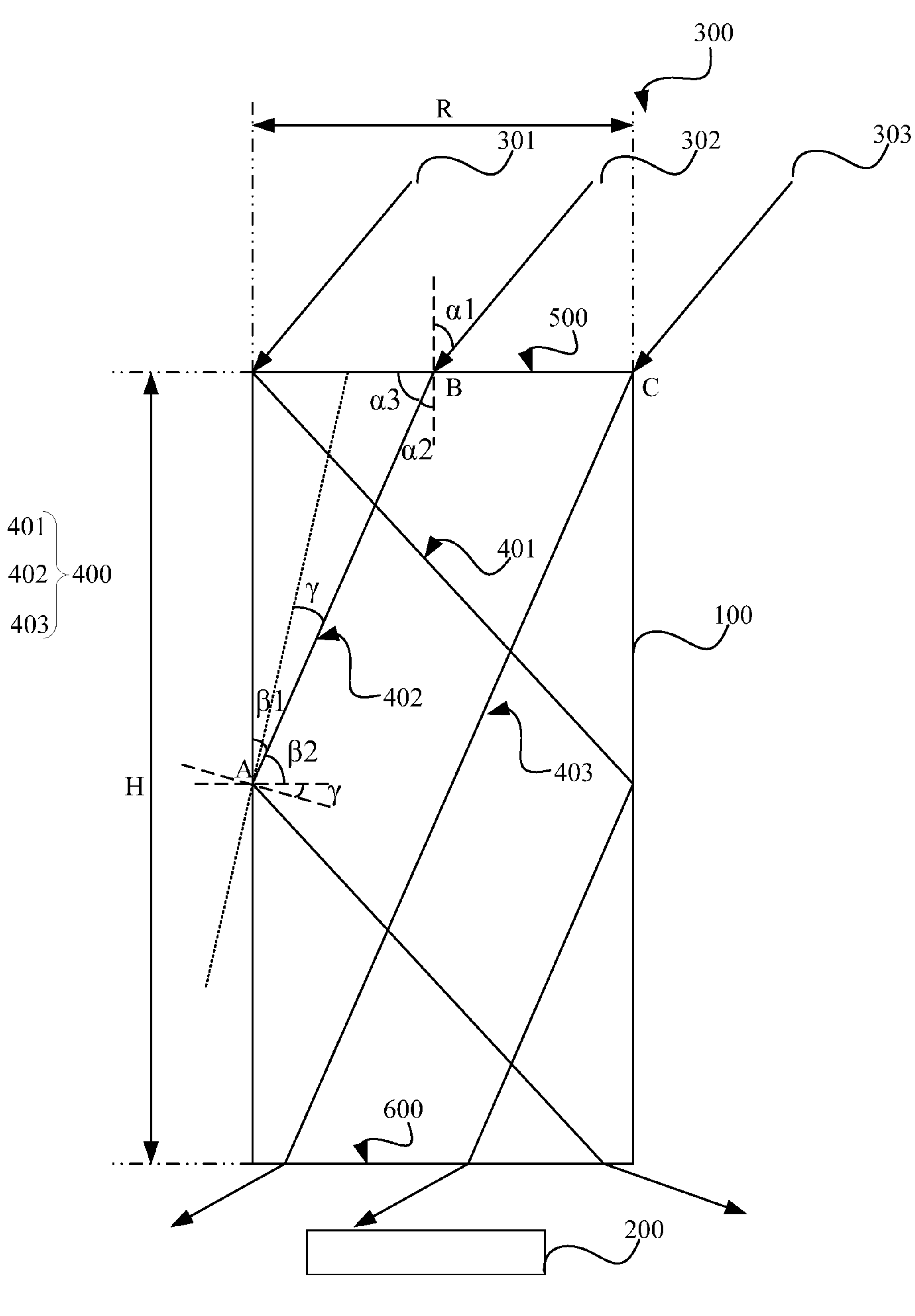
FIG. 4 is a schematic diagram of the process of adjusting a sidewall structure of a cylindrical light guide column according to an embodiment of the present disclosure.

Therefore, to avoid the light leakage on the sidewall, the incidence angle $\beta 2$ of the refracted light 400 on the sidewall needs to be increased. FIG. 4 is a schematic diagram of the process of adjusting a sidewall structure of a cylindrical light guide column according to an embodiment of the present disclosure. As shown in FIG. 4, when the sidewall of the cylindrical light guide column 100 is inclined towards the center axis of the light guide column 100 (for example, the dotted line shows the adjusted sidewall), the incidence angle $\beta 2$ of the refracted light 400 on the sidewall is increased, thereby avoiding the problem that the light transmission efficiency is reduced caused by the light leakage on the sidewall when the refracted light 400 is refracted on the sidewall in a case where the incidence angle $\beta 2$ of the refracted light 400 on the sidewall is less than the total internal reflection angle.

With continued reference to FIG. 4, optionally, the step where the first inclination angle range of the sidewall of the light guide column is acquired according to the refraction angle $\alpha 2$ and the total internal reflection angle includes the steps described below.

The complementary angle $\alpha 3$ of the refraction angle is acquired based on the refraction angle $\alpha 2$.

A difference between the complementary angle $\alpha 3$ of the refraction angle and the total internal reflection angle is taken as the minimum inclination angle in the first inclination angle range.

It is to be understood that before the sidewall of the light guide column is adjusted, the complementary angle $\alpha 3$ of the refraction angle is the incidence angle $\beta 2$ of the refracted light 400 on the sidewall, the refraction angle $\alpha 2$ is the complementary angle $\beta 1$ of the incidence angle $\beta 2$ of the refracted light 400 on the sidewall, and with the difference $\gamma$ between the complementary angle $\alpha 3$ of the refraction angle and the total internal reflection angle, the sidewall is inclined towards the center axis of the light guide column by a minimum inclination angle $\gamma$ so that the magnitude of the incidence angle of the refracted light 400 on the sidewall becomes $\beta 2+\gamma$ to enable the refracted light 400 to be totally reflected on the sidewall of the light guide column, thereby avoiding light leakage on the sidewall. It is to be noted that the first inclination angle is greater than the minimum inclination angle $\gamma$ and less than the complementary angle $\beta 1$ (that is, the refraction angle $\alpha 2$) of the incidence angle $\beta 2$.

In S104, a position at which a marginal light 303 of the light guide column 100 is first incident on the sidewall of the light guide column 100 after refracted by the light incident surface 500 is calculated based on the refraction angle $\alpha 2$ and the light incident surface diameter R, where the position is denoted as a first position.

In terms of the orientation of FIG. 4, the marginal light 303 is a right-edge light. When the marginal light 303 is incident on the sidewall, the height from the first position to the light incident surface 500 is calculated based on the light incident surface diameter R and the refraction angle $\alpha 2$ by geometric calculation to determine the first position.

In S105, in a direction from the first position to the bottom surface of the light guide column 100, the sidewall of the light guide column is adjusted according to the first inclination angle range to form a first inclination surface to enable the refracted light to be totally reflected on the first inclination surface.

It is to be understood that after the first inclination angle is calculated through step S103, the position where the sidewall of the cylindrical light guide column is adjusted needs to be further determined.

Figure 5:
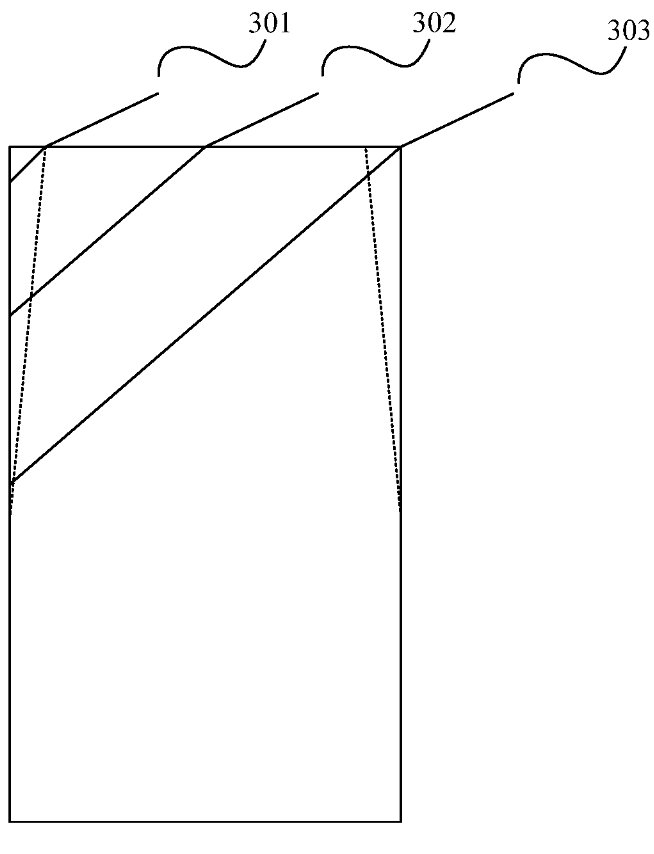
FIG. 5 is a schematic diagram of the process of adjusting a sidewall structure of a cylindrical light guide column according to an embodiment of the present disclosure.
Figure 6:
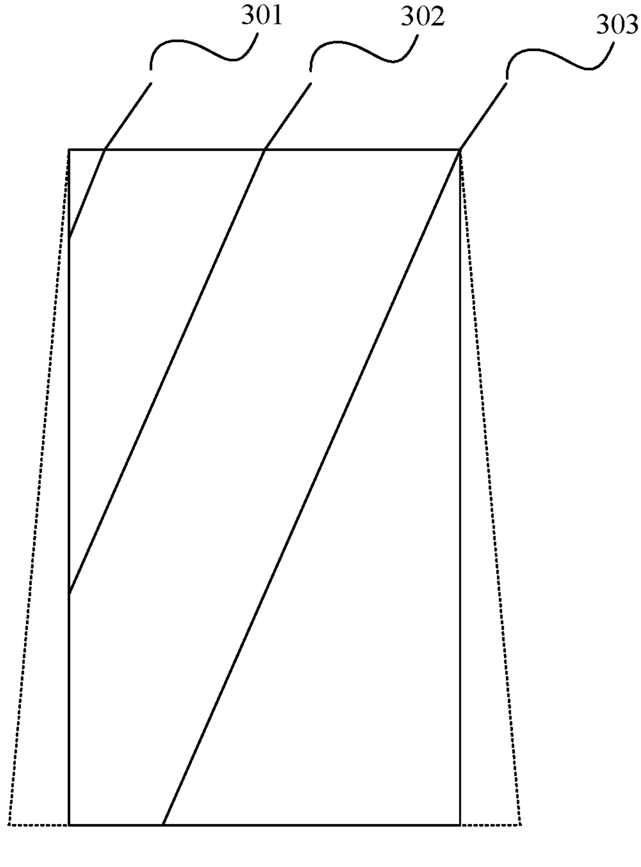
FIG. 6 is a schematic diagram of the process of adjusting a sidewall structure of a cylindrical light guide column according to another embodiment of the present disclosure.

FIG. 5 is a schematic diagram of the process of adjusting a sidewall structure of a cylindrical light guide column according to an embodiment of the present disclosure. FIG. 6 is a schematic diagram of the process of adjusting a sidewall structure of a cylindrical light guide column according to another embodiment of the present disclosure. Optionally, in the direction from the first position to the bottom surface of the light guide column, the method includes the steps described below:

As shown in FIG. 5, in a case where the first position is located above the middle height of the light guide column and is close to the light incident surface of the light guide column, in a direction from the first position to the light incident surface of the light guide column, the sidewall of the light guide column is adjusted by inclining the sidewall from the first position in a direction facing the center axis of the light guide column to form a circular table.

As shown in FIG. 6, in a case where the first position is located below the middle height of the light guide column and is close to the light exit surface of the light guide column, in a direction from the light incident surface to the first position of the light guide column, the sidewall of the light guide column is adjusted by increasing the diameter of the light guide column in a direction away from the center axis of the light guide column.

When the first position is located above the middle height of the light guide column and is close to the light incident surface of the light guide column, indicating that little light is refracted in the direction from the first position to the light exit surface (as shown in FIG. 5, the dotted portion is the cut sidewall of the light guide column, that is, the adjusted sidewall of the light guide column), the sidewall of the light guide column is adjusted in the direction from the first position to the light incident surface of the light guide column.

When the first position is located below the middle height of the light guide column and is close to the light exit surface of the light guide column, indicating that the refracted light exists in the light guide column from the light exit surface to the first position (as shown in FIG. 6, the dotted portion is the adjusted sidewall of the light guide column), the sidewall of the light guide column may be adjusted in the same manner described above. The sidewall of the light guide column may also be adjusted in the direction from the light incident surface to the first position of the light guide column by increasing the diameter of the light guide column in the direction away from the center axis of the light guide column. Since cutting the light guide column in the direction facing the center axis of the light guide column may cause the light incident surface to be reduced to a great extent (for example, the area of the light incident surface is less than half of the original area), the sidewall of the light guide column is adjusted by increasing the diameter of the light guide column in the direction away from the center axis of the light guide column, thereby improving the light transmission efficiency without reducing the area of the light incident surface. In this manner, the original cylindrical light guide is designed as a circular table.

Therefore, after the incidence angle $\alpha 1$ of the incident light 300 is determined, when the refracted light 400 cannot be totally reflected on the sidewall, the sidewall of the light guide column may be adjusted using the above-mentioned adjustment method, thereby avoiding the reduction of the light transmission efficiency caused by light leakage on the sidewall.

On the basis of the preceding embodiment, to enable more light emitted from the light exit surface 600 to arrive on the photosensitive element 200, the shape of the sidewall of the light guide column may be designed according to the following solutions.

Figure 7:
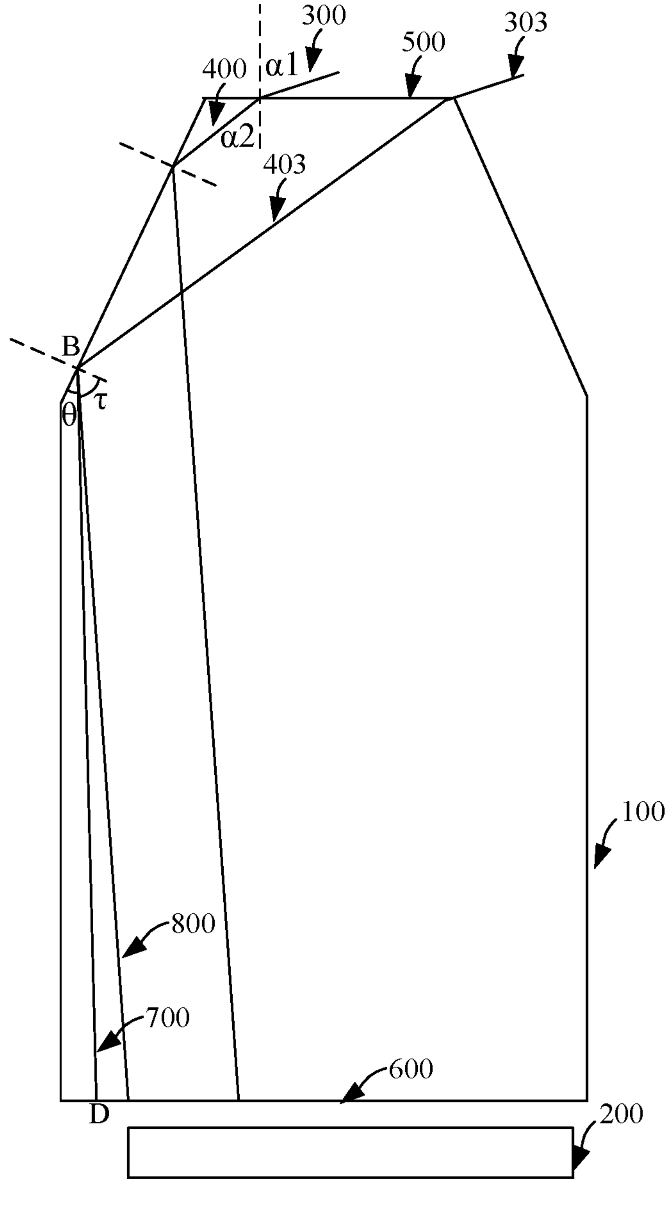
FIG. 7 is a schematic diagram of the process of adjusting a sidewall structure of a cylindrical light guide column according to yet another embodiment of the present disclosure.

Optionally, FIG. 7 is a schematic diagram of the process of adjusting a sidewall structure of a cylindrical light guide column according to yet another embodiment of the present disclosure. As shown in FIG. 7, after the sidewall of the light guide column is adjusted in the direction from the first position to the bottom surface of the light guide column according to the first inclination angle range to form the first inclination surface, the method further includes the steps described below:

A position at which the marginal light 303 of the light guide column 100 is first incident on the first inclination surface after refracted by the light incident surface is calculated based on the refraction angle $\alpha 2$ and the light incident surface diameter R, where the position is denoted as a second position (for example, the point B in FIG. 7).

In a direction from the second position to the bottom surface of the light guide column, the sidewall of the light guide column is adjusted according to a second included angle $\theta 1$ between a second connection line 700 formed by connecting the target light exit point (for example, the point D in FIG. 7) of the light exit surface 600 of the light guide column 100 and the second position and the first inclination surface to form a third inclination surface to enable the refracted light 400 to be totally reflected on the third inclination surface and hit the target light exit point.

That is, after the sidewall of the light guide column is adjusted and the first inclination surface is formed, the sidewall may be further adjusted based on the target light exit point of the light exit surface, thereby improving the quantity of light received by the photosensitive element 200 and improving the light transmission efficiency.

Optionally; the step where the sidewall of the light guide column is adjusted in the direction from the second position to the bottom surface of the light guide column according to the second included angle θ1 between the second connection line 700 and the first inclination surface to form the third inclination surface includes the steps described below.

In a case where the second included angle θ1 is less than the complementary angle θ of the reflection angle τ of the refracted light 400 on the first inclination surface and greater than an included angle between the first inclination surface and the sidewall and the reflection angle τ of the refracted light 400 on the first inclination surface is greater than or equal to the total internal reflection angle, a difference between the complementary angle θ of the reflection angle of the refracted light 400 on the first inclination surface and the second included angle θ1 is taken as the inclination angle of the third inclination surface, and the third inclination surface is inclined in a direction facing the center axis of the light guide column.

It is to be understood that since the second included angle θ1 is less than the complementary angle θ of the reflection angle τ and greater than the included angle between the first inclination surface and the sidewall, as shown in FIG. 7, the target light exit point D is on the right side of a perpendicular line from the point B to the light exit surface 600 and is on the left side of the reflected light 800 of the refracted light 403 reflected by the first inclination surface. Therefore, the reflected light 800 may be moved left, and the first inclination surface may be inclined in the direction facing the center axis of the light guide column. Since the reflection angle τ is greater than or equal to the total internal reflection angle, the inclination of the first inclination surface in the direction facing the center axis of the light guide column does not affect the total internal reflection of light on the first inclination surface.

In a case where the second included angle θ1 is greater than the complementary angle θ of the reflection angle τ of the refracted light 403 on the first inclination surface and less than the complementary angle of the total internal reflection angle and the reflection angle τ of the refracted light 403 on the first inclination surface is greater than the total internal reflection angle, a difference between the reflection angle of the refracted light 403 on the first inclination surface and the second included angle θ1 is taken as the inclination angle of the third inclination surface, and the third inclination surface is inclined in a direction away from the center axis of the light guide column.

Figure 8:
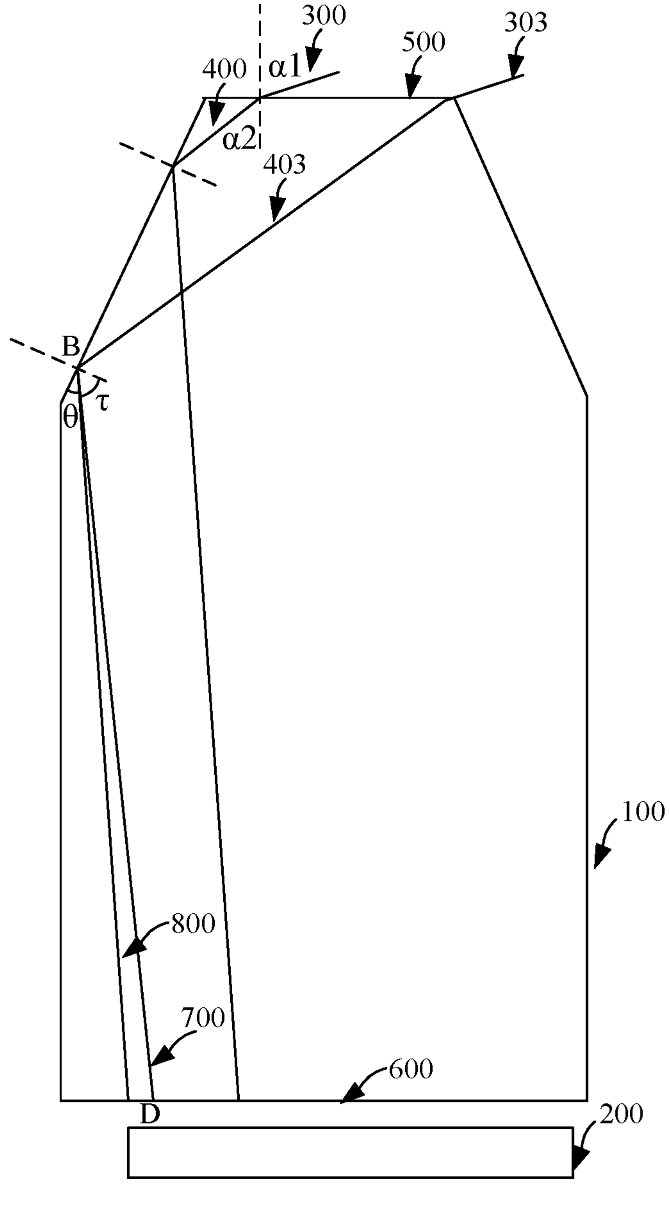
FIG. 8 is a schematic diagram of the process of adjusting a sidewall structure of a cylindrical light guide column according to yet another embodiment of the present disclosure.

In other words, FIG. 8 is a schematic diagram of the process of adjusting a sidewall structure of a cylindrical light guide column according to yet another embodiment of the present disclosure. As shown in FIG. 8, since the second connection line 700 is located on the right side of the reflected light 800 and is located on the left side of the reflected light 800 whose reflection angle τ is the total internal reflection angle, the inclination angle of the first inclination surface can be reduced so that the reflected light 800 can be moved right on the light exit surface 600.

In a case where the second included angle θ1 is greater than the complementary angle θ of the reflection angle τ of the refracted light 403 on the first inclination surface and greater than the complementary angle of the total internal reflection angle and the reflection angle τ of the refracted light 403 on the first inclination surface is greater than the total internal reflection angle, a difference between the reflection angle of the refracted light on the first inclination surface and the total internal reflection angle is taken as the inclination angle of the third inclination surface, and the third inclination surface is inclined in the direction away from the center axis of the light guide column.

It is to be understood that since the second connection line 700 is located on the right side of the reflected light 800 and is located on the left side of the reflected light 800 whose reflection angle τ is the total internal reflection angle, the inclination angle of the first inclination surface is adjusted until the reflection angle τ of the refracted light 403 on the first inclination surface is the total internal reflection angle.

In a case where the second included angle θ1 is greater than the complementary angle θ of the reflection angle τ of the refracted light 403 on the first inclination surface and greater than or equal to the complementary angle of the total internal reflection angle and the reflection angle τ of the refracted light on the first inclination surface is equal to the total internal reflection angle, in a case where the second included angle θ1 is equal to the complementary angle of the reflection angle τ of the refracted light 403 on the first inclination surface or in a case where the second included angle θ1 is less than the included angle between the first inclination surface and the sidewall, no adjustment is performed.

Since the second included angle θ1 is less than the included angle between the first inclination surface and the sidewall, indicating that the target light exit point D is on the left side of the perpendicular line from the point B to the light exit surface 600, when all light emitted from the target light exit point D can arrive on the photosensitive element 200, light on the right side of the perpendicular line from the point B to the light exit surface 600 can also arrive on the photosensitive element 200, and thus, no adjustment is performed.

When the reflection angle τ of the refracted light on the first inclination surface is equal to the total internal reflection angle, no adjustment is performed, that is, the target light exit point is adjusted without sacrificing the total internal reflection on the first inclination surface.

When the second included angle θ1 is equal to the complementary angle of the reflection angle τ of the refracted light 403 on the first inclination surface, indicating that the light exit point of the reflected light 800 is exactly the same as the target light exit point, no adjustment needs to be performed.

In summary, in this embodiment, when the reflection angle of the first inclination surface is equal to the total internal reflection angle, the inclination angle of the first inclination surface may be increased so that an intersection point of the reflected light 800 of the first inclination surface and the light exit surface 600 moves left from the current position, but the adjustment limit is the foot of the perpendicular line from the point B to the light exit surface 600 (the adjustment basis of this embodiment is that the reflected light 800 is on the right side of the foot of the perpendicular line from the point B to the light exit surface 600). If the reflected light 800 is on the left side of the perpendicular line from the point B to the light exit surface 600, indicating that the reflected light 800 will hit on the sidewall of the light guide column again, the emitted light basically arrives on the photosensitive element 200, and this situation is not considered. Therefore, in a case where the first inclination surface meets the requirement of total internal reflection, the first inclination surface may be further adjusted according to the position of the target light exit point to form the third inclination surface.

In the example shown in FIG. 6, the adjustment is performed in the above-mentioned method. The details are not repeated here.

Figure 9:
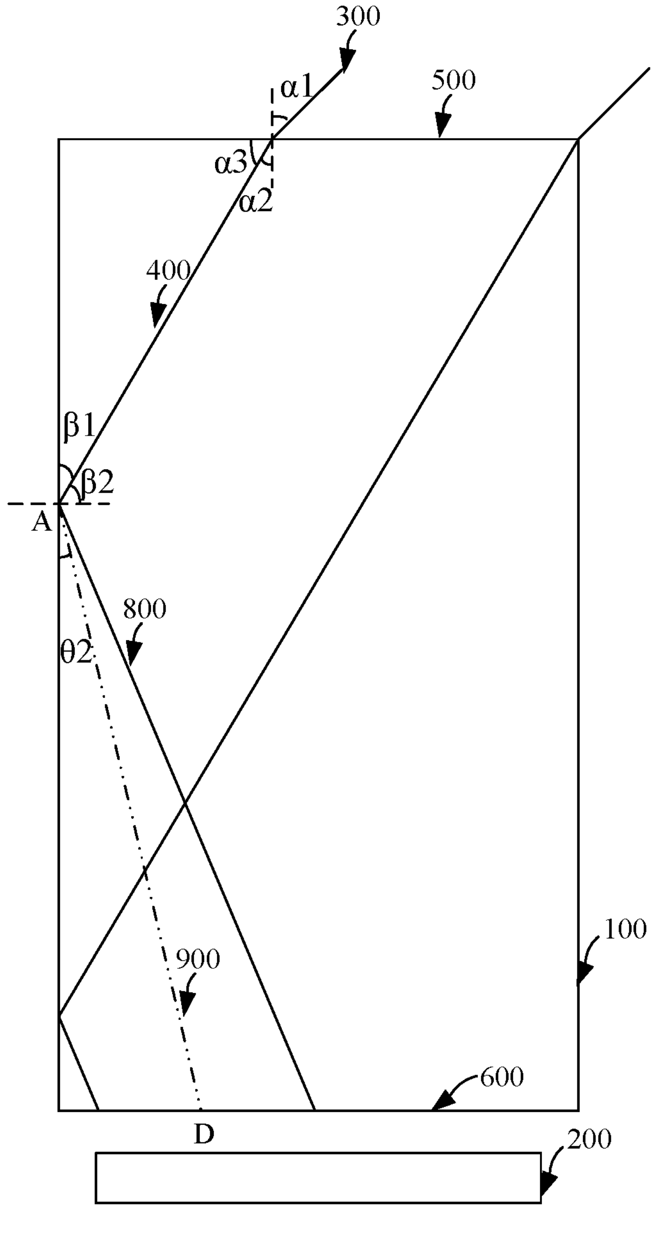
FIG. 9 is a schematic diagram of the process of adjusting a sidewall structure of a cylindrical light guide column according to yet another embodiment of the present disclosure.

In another embodiment, FIG. 9 is a schematic diagram of the process of adjusting a sidewall structure of a cylindrical light guide column according to yet another embodiment of the present disclosure. As shown in FIG. 9, optionally, in a case where the complementary angle $\alpha 3$ of the refraction angle $\alpha 2$ is greater than or equal to the total internal reflection angle, the method further includes the step described below:

In the direction from the first position A to the bottom surface of the light guide column, the sidewall of the light guide column is adjusted according to a first included angle between a first connection line 900 formed by connecting a target light exit point D of a light exit surface 600 of the light guide column and the first position A and the sidewall of the light guide column 100 to form a second inclination surface to enable the refracted light to be totally reflected on the second inclination surface and hit the target light exit point.

That is, when the complementary angle $\alpha 3$ of the refraction angle $\alpha 2$ is greater than or equal to the total internal reflection angle, that is, when the incidence angle $\beta 2$ of the refracted light 400 on the sidewall is greater than the total internal reflection angle, the light may be totally reflected in the light guide column. However, the light exit point may not meet the requirement of hitting the photosensitive element 200, and thus, the sidewall is adjusted to enable the light exit point to hit the photosensitive element 200, thereby improving the light transmission efficiency.

Optionally, with continued reference to FIG. 9, the step where the sidewall of the light guide column is adjusted in the direction from the first position A to the bottom surface of the light guide column according to the first included angle $\theta 2$ between the first connection line 900 and the sidewall of the light guide column to form the second inclination surface includes the steps described below:

In a case where the first included angle $\theta 2$ is less than the refraction angle $\alpha 2$ (that is, the complementary angle $\beta 1$ of the reflection angle $\beta 2$), a difference between the first included angle $\theta 2$ and the refraction angle $\alpha 2$ is taken as the inclination angle of the second inclination surface, and the second inclination surface is inclined in a direction facing the center axis of the light guide column.

That is, although the sidewall meets the requirement of totally reflecting the refracted light 400, the sidewall does not meet the requirement of receiving light on the photosensitive element 200. Therefore, the sidewall may be inclined to reduce the reflection angle $\beta 2$. For the principle of reducing the reflection angle $\beta 2$, reference may be made to the principle of increasing the reflection angle $\beta 2$ in the preceding embodiments. The details are not repeated here.

Figure 10:
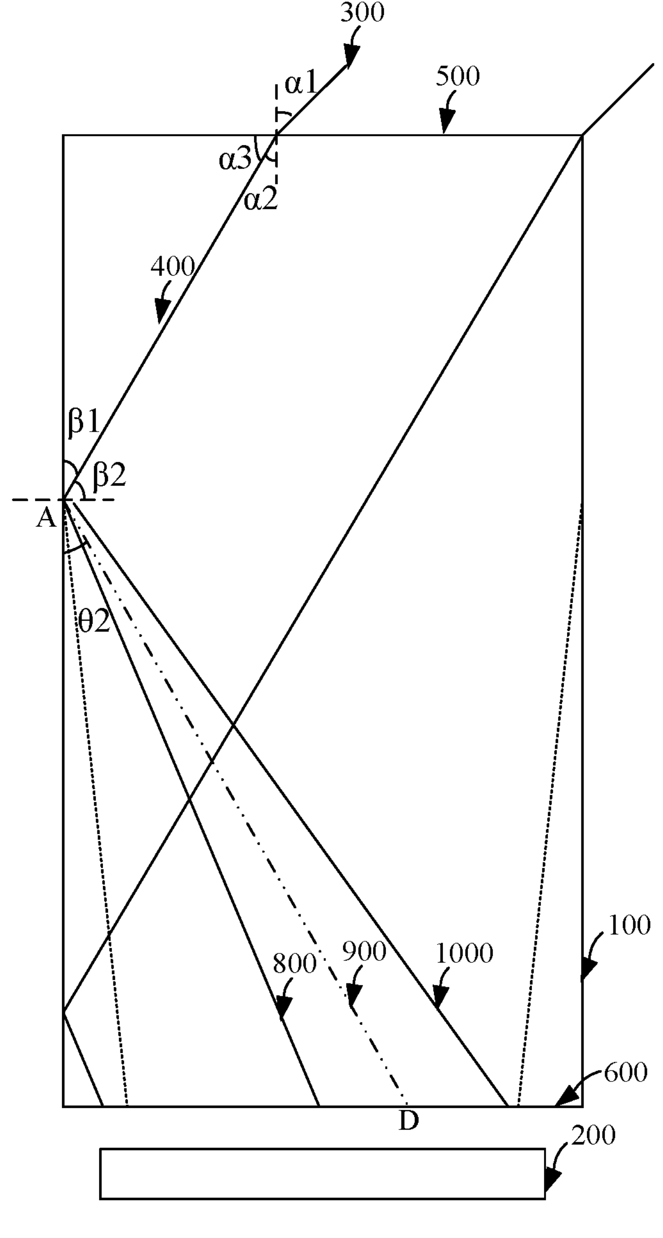
FIG. 10 is a schematic diagram of the process of adjusting a sidewall structure of a cylindrical light guide column according to yet another embodiment of the present disclosure.

FIG. 10 is a schematic diagram of the process of adjusting a sidewall structure of a cylindrical light guide column according to yet another embodiment of the present disclosure. As shown in FIG. 10, in a case where the first included angle $\theta 2$ is greater than the refraction angle $\alpha 2$ (that is, the complementary angle $\beta 1$ of the reflection angle $\beta 2$), the complementary angle of the first included angle $\theta 2$ is greater than the total internal reflection angle and the complementary angle $\alpha 3$ of the refraction angle $\alpha 2$ is greater than the total internal reflection angle, a difference between the complementary angle $\alpha 3$ of the refraction angle $\alpha 2$ and the complementary angle of the first included angle $\theta 2$ is taken as the inclination angle of the second inclination surface, and the second inclination surface is inclined in a direction away from the center axis of the light guide column.

That is, at this point, the target light exit point D is located on the right side of the intersection point of the reflected light 800 and the light exit surface 600 and is located on the left side of the intersection point of the totally reflected light 1000 and the light exit surface 600, and the sidewall of the light guide column may be adjusted by retracting the sidewall from the first position point A towards the light exit surface to form a circular table where the light exit surface 600 is reduced (where the dotted line is the adjusted shape).

In a case where the first included angle $\theta 2$ is greater than the refraction angle $\alpha 2$ (that is, the complementary angle $\beta 1$ of the reflection angle $\beta 2$), the complementary angle of the first included angle $\theta 2$ is less than the total internal reflection angle and the complementary angle $\alpha 3$ of the refraction angle $\alpha 2$ is greater than the total internal reflection angle, a difference between the complementary angle of the refraction angle and the total internal reflection angle is taken as the inclination angle of the second inclination surface, and the second inclination surface is inclined in the direction away from the center axis of the light guide column.

That is, at this point, the target light exit point D has been moved to the right side of the intersection point of the totally reflected light 1000 and the light exit surface 600, the target light exit point D is met as much as possible, the intersection point of the totally reflected light 1000 and the light exit surface 600 is the final target light exit point, and the reflection angle $\beta 2$ is no longer reduced.

In a case where the first included angle $\theta 2$ is greater than the refraction angle $\alpha 2$ (that is, the complementary angle $\beta 1$ of the reflection angle $\beta 2$), the complementary angle of the first included angle $\theta 2$ is less than the total internal reflection angle and the complementary angle of the refraction angle $\alpha 2$ is equal to the total internal reflection angle or in a case where the first included angle $\theta 2$ is equal to the refraction angle, no adjustment is performed.

In summary, in this embodiment, the light exit point of the emitted light 800 may be changed by adjusting the inclination of the sidewall from the light exit surface towards the first position A, thereby meeting the purpose of hitting the photosensitive element 200.

In other embodiments, the upper side of the light guide column may be adjusted at a first incidence angle, and then the lower side of the light guide column may be adjusted at a second incidence angle. For example, the first incidence angle is greater than the incidence angle corresponding to the total internal reflection angle, and the second incidence angle is less than the incidence angle corresponding to the internal reflection angle. Therefore, the same light guide column may meet the requirements of different incidence angles.

In summary, by changing the inclination of the sidewall of the cylindrical light guide column, the light leakage problem of the sidewall of the light guide column can be solved, and the light exit point can be changed to meet the requirement of receiving light on the photosensitive element, thereby improving the light transmission efficiency of the whole light guide column.

The embodiments of the present disclosure provide an apparatus for adjusting a sidewall structure of a cylindrical light guide column. The apparatus includes an acquisition module, a first calculation module, a second calculation module, a third calculation module, and an execution module.

The acquisition module is configured to acquire a size parameter of a light guide column, where the size parameter includes: a light incident surface diameter, a light exit surface diameter, a light guide column height, a light guide column refractive index, and an incidence angle of an incident light.

The first calculation module is configured to calculate, based on the law of refraction, a total internal reflection angle of the light guide column according to the light guide column refractive index and an air refractive index, and calculate, in conjunction with the incidence angle of the incident light, a refraction angle of a refracted light that is refracted by a light incident surface of the light guide column.

The second calculation module is configured to acquire, in a case where the complementary angle of the refraction angle is less than the total internal reflection angle, a first inclination angle range of a sidewall of the light guide column according to the refraction angle and the total internal reflection angle.

The third calculation module is configured to calculate, based on the refraction angle and the light incident surface diameter, a position at which a marginal light of the light guide column is first incident on the sidewall of the light guide column after refracted by the light incident surface, where the position is denoted as a first position.

The execution module is configured to adjust, in a direction from the first position to the bottom surface of the light guide column, the sidewall of the light guide column according to the first inclination angle range to form a first inclination surface to enable the refracted light to be totally reflected on the first inclination surface.

Optionally, the apparatus further includes a second inclination surface formation module which is configured to, in a case where the complementary angle of the refraction angle is greater than or equal to the total internal reflection angle, execute the step described below.

In the direction from the first position to the bottom surface of the light guide column, the sidewall of the light guide column is adjusted according to a first included angle between a first connection line formed by connecting a target light exit point of a light exit surface of the light guide column and the first position and the sidewall of the light guide column to form a second inclination surface to enable the refracted light to be totally reflected on the second inclination surface and hit the target light exit point.

Optionally, the apparatus further includes a third inclination surface formation module which is configured to, after the sidewall of the light guide column is adjusted in the direction from the first position to the bottom surface of the light guide column according to the first inclination angle range to form the first inclination surface, execute the steps described below:

A position at which the marginal light of the light guide column is first incident on the first inclination surface after refracted by the light incident surface is calculated based on the refraction angle and the light incident surface diameter, where the position is denoted as a second position.

In a direction from the second position to the bottom surface of the light guide column, the sidewall of the light guide column is adjusted according to a second included angle between a second connection line formed by connecting the target light exit point of the light exit surface of the light guide column and the second position and the first inclination surface to form a third inclination surface to enable the refracted light to be totally reflected on the third inclination surface and hit the target light exit point.

Optionally, in the direction from the first position to the bottom surface of the light guide column, the apparatus is further configured to execute the steps described below.

In a case where the first position is located above the middle height of the light guide column and is close to the light incident surface of the light guide column, in a direction from the first position to the light incident surface of the light guide column, the sidewall of the light guide column is adjusted by inclining the sidewall from the first position in a direction facing the center axis of the light guide column to form a circular table.

In a case where the first position is located below the middle height of the light guide column and is close to the light exit surface of the light guide column, in a direction from the light incident surface to the first position of the light guide column, the sidewall of the light guide column is adjusted by increasing the diameter of the light guide column in a direction away from the center axis of the light guide column.

Optionally, the second calculation module further includes a second calculation unit which is configured to execute the following steps included in the step where the first inclination angle range of the sidewall of the light guide column is acquired according to the refraction angle and the total internal reflection angle.

The complementary angle of the refraction angle is acquired based on the refraction angle.

A difference between the complementary angle of the refraction angle and the total internal reflection angle is taken as the minimum inclination angle in the first inclination angle range.

Optionally, the second inclination surface formation module is configured to execute the following steps included in the step where the sidewall of the light guide column is adjusted in the direction from the first position to the bottom surface of the light guide column according to the first included angle between the first connection line and the sidewall of the light guide column to form the second inclination surface.

In a case where the first included angle is less than the refraction angle, a difference between the first included angle and the refraction angle is taken as the inclination angle of the second inclination surface, and the second inclination surface is inclined in the direction facing the center axis of the light guide column.

In a case where the first included angle is greater than the refraction angle, the complementary angle of the first included angle is greater than the total internal reflection angle and the complementary angle of the refraction angle is greater than the total internal reflection angle, a difference between the complementary angle of the refraction angle and the complementary angle of the first included angle is taken as the inclination angle of the second inclination surface, and the second inclination surface is inclined in the direction away from the center axis of the light guide column.

In a case where the first included angle is greater than the refraction angle, the complementary angle of the first included angle is less than the total internal reflection angle and the complementary angle of the refraction angle is greater than the total internal reflection angle, a difference between the complementary angle of the refraction angle and the total internal reflection angle is taken as the inclination angle of the second inclination surface, and the second inclination surface is inclined in the direction away from the center axis of the light guide column.

In a case where the first included angle is greater than the refraction angle, the complementary angle of the first included angle is less than the total internal reflection angle and the complementary angle of the refraction angle is equal to the total internal reflection angle or in a case where the first included angle is equal to the refraction angle, no adjustment is performed.

Optionally, the third inclination surface formation module is further configured to execute the following steps included in the step where the sidewall of the light guide column is adjusted in the direction from the second position to the bottom surface of the light guide column according to the second included angle between the second connection line and the first inclination surface to form the third inclination surface.

In a case where the second included angle is less than the complementary angle of the reflection angle of the refracted light on the first inclination surface and greater than an included angle between the first inclination surface and the sidewall and the reflection angle of the refracted light on the first inclination surface is greater than or equal to the total internal reflection angle, a difference between the complementary angle of the reflection angle of the refracted light on the first inclination surface and the second included angle is taken as the inclination angle of the third inclination surface, and the third inclination surface is inclined in the direction facing the center axis of the light guide column.

In a case where the second included angle is greater than the complementary angle of the reflection angle of the refracted light on the first inclination surface and less than the complementary angle of the total internal reflection angle and the reflection angle of the refracted light on the first inclination surface is greater than the total internal reflection angle, a difference between the reflection angle of the refracted light on the first inclination surface and the second included angle is taken as the inclination angle of the third inclination surface, and the third inclination surface is inclined in the direction away from the center axis of the light guide column.

In a case where the second included angle is greater than the complementary angle of the reflection angle of the refracted light on the first inclination surface and greater than the complementary angle of the total internal reflection angle and the reflection angle of the refracted light on the first inclination surface is greater than the total internal reflection angle, a difference between the reflection angle of the refracted light on the first inclination surface and the total internal reflection angle is taken as the inclination angle of the third inclination surface, and the third inclination surface is inclined in the direction away from the center axis of the light guide column.

In a case where the second included angle is greater than the complementary angle of the reflection angle of the refracted light on the first inclination surface and greater than or equal to the complementary angle of the total internal reflection angle and the reflection angle of the refracted light on the first inclination surface is equal to the total internal reflection angle, in a case where the second included angle is equal to the complementary angle of the reflection angle of the refracted light on the first inclination surface or in a case where the second included angle is greater than the included angle between the first inclination surface and the sidewall, no adjustment is performed.

The apparatus for adjusting a sidewall structure of a cylindrical light guide column provided by the embodiments of the present disclosure is capable of executing the method for adjusting a sidewall structure of a cylindrical light guide column provided by any one of the embodiments of the present disclosure and has functional modules and beneficial effects corresponding to the executed method.

The embodiments of the present disclosure provide a light guide column which is based on a cylindrical light guide column. The light guide column includes a light incident surface, a light exit surface and a sidewall, and the sidewall is adjusted based on the method for adjusting a sidewall structure of a cylindrical light guide column provided by any one of the embodiments of the present disclosure.

Figure 11:
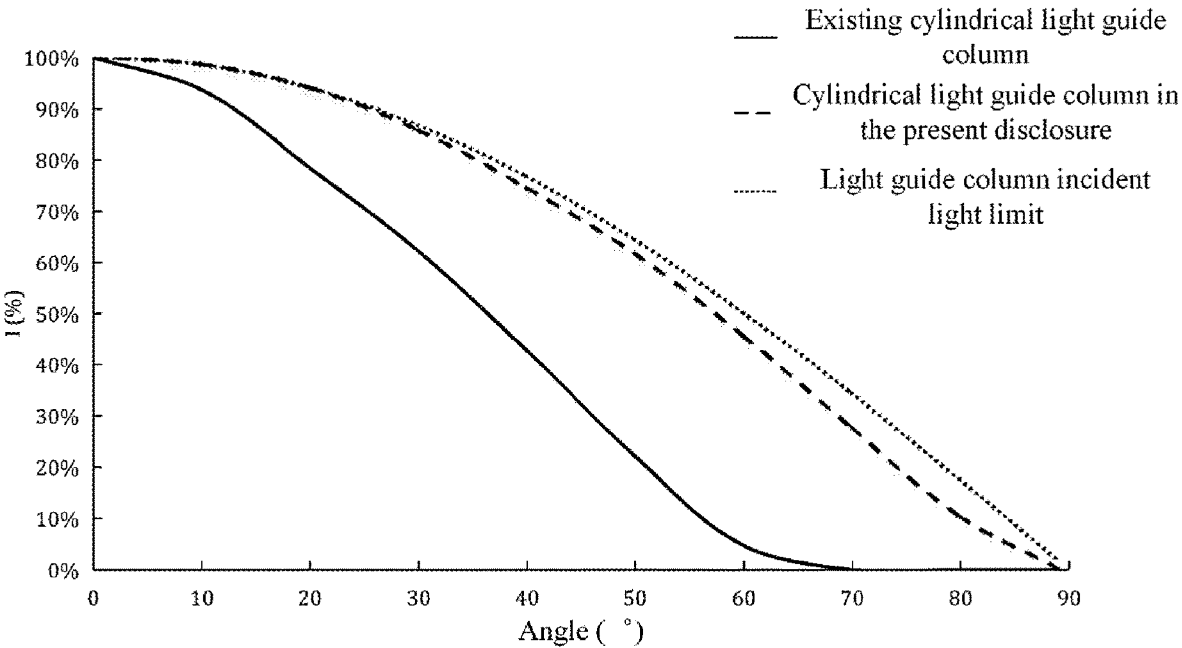
FIG. 11 is a schematic diagram of the change in the light transmission efficiency of a light guide column provided by an embodiment of the present disclosure and an existing light guide column with the change in the incidence angle.

FIG. 11 is a schematic diagram of the change in the light transmission efficiency of a light guide column provided by an embodiment of the present disclosure and an existing light guide column with the change in the incidence angle. As shown in FIG. 11, the existing light guide column is not optimized and adjusted for light incidence through the above-mentioned design method, and thus as the light incidence angle is increased, the light transmission efficiency is significantly reduced, with reference to FIG. 11. The shape of the light guide column in the present disclosure is adjusted through the above-mentioned design method, thereby greatly improving the light transmission efficiency of the light guide column. As can be seen from FIG. 11, the light transmission efficiency of the newly designed light guide column is significantly higher than the light transmission efficiency of the existing light guide column and also approaches the limit of the incident light quantity of the light guide column. The limit of the incident light quantity of the light guide column is a limit value of light quantity on the light incident surface of the light guide column, and the value may be obtained by means of vector calculation (with the same light source and the fixed light incident area, the incident light limit of light is related to the included angle between the incident light and the normal line of the light incident surface. The included angle between the incident light and the normal line of the light incident surface may be described by means of vectors, and the incident light limit is calculated according to the concept of the light quantity, for example, the light quantity is maximum when light is incident at the degrees of 0). The above-mentioned new design method can effectively improve the performance of the photosensitive element, extend the receiving of light from different angles, reduce the limitation on the light entering direction, and reduce the possibility of misjudgment on ambient light or infrared light.

The above-mentioned method may be applied to the light guide columns with various light receiving forms. The shape of the light guide column is adjusted through the method to enable light incident at different angles to hit on a sensor or a target material, thereby improving the photosensitivity of the assembly and reducing the misjudgment probability. The design may be applied to infrared receivers and configured in most existing home appliances or electronic apparatuses that are equipped with infrared receivers. Through the method provided in this solution, the angle at which a receiving end can receive signals can be increased, and the strength of signals at large angles can be improved. The design may be applied to ambient light sensors (ALSs) and configured in smart doorbells, smart appliances and smart homes for more accurately detecting external ambient brightness to wake up electrical appliances, supplement light or adjust the brightness of electric lights or screens, thereby saving energy.

For infrared receivers, a large hole is generally opened for an infrared receiver in a mechanism, and a signal source of an external remote control or an infrared signal source may be directly transmitted to the receiver through a one-piece infrared penetrable optical thin-shell design. However, in recent years, with the rapid changes in electronic products, in addition to functions, consumers pay attention to the appearance design. In this manner, the opportunity of opening a hole on the appearance of electronic products is reduced, and even if a hole really needs to be opened, the size of the hole is reduced to meet appearance requirements.

Therefore, the preceding conventional cylindrical light guide design is widely applied to such a type of commodity. ALSs are widely applied in various fields, including smart doorbells, smart displays, mobile phones, etc. Such a sensor sends the brightness information of the environment back to a back end, and the intelligent apparatus may determine according to the brightness information whether to wake up the display or to adjust the brightness of the display to meet the requirements of current operations or the brightness requirements of a user, thereby reducing the unnecessary battery power consumption.

In conclusion, the embodiments of the present disclosure provide a light guide column and a method and apparatus for adjusting a sidewall structure of a cylindrical light guide column. The method includes: acquiring a size parameter of a light guide column, where the size parameter includes: a light incident surface diameter, a light exit surface diameter, a light guide column height, a light guide column refractive index, and an incidence angle of an incident light; calculating, based on the law of refraction, a total internal reflection angle of the light guide column according to the light guide column refractive index and an air refractive index, and calculating, in conjunction with the incidence angle of the incident light, a refraction angle of a refracted light that is refracted by a light incident surface of the light guide column; acquiring, in a case where the complementary angle of the refraction angle is less than the total internal reflection angle, a first inclination angle range of a sidewall of the light guide column according to the refraction angle and the total internal reflection angle: calculating, based on the refraction angle and the light incident surface diameter, a position at which a marginal light of the light guide column is first incident on the sidewall of the light guide column after refracted by the light incident surface, where the position is denoted as a first position; and adjusting, in a direction from the first position to the bottom surface of the light guide column, the sidewall of the light guide column according to the first inclination angle range to form a first inclination surface to enable the refracted light to be totally reflected on the first inclination surface. Therefore, as the incidence angle is increased, the incidence angle at which the refracted light is incident onto the sidewall may be changed by changing the shape of the sidewall of the cylindrical light guide column to enable the refracted light to be totally reflected on the sidewall, thereby reducing optical energy loss and improving light transmission efficiency.

Figure 12:
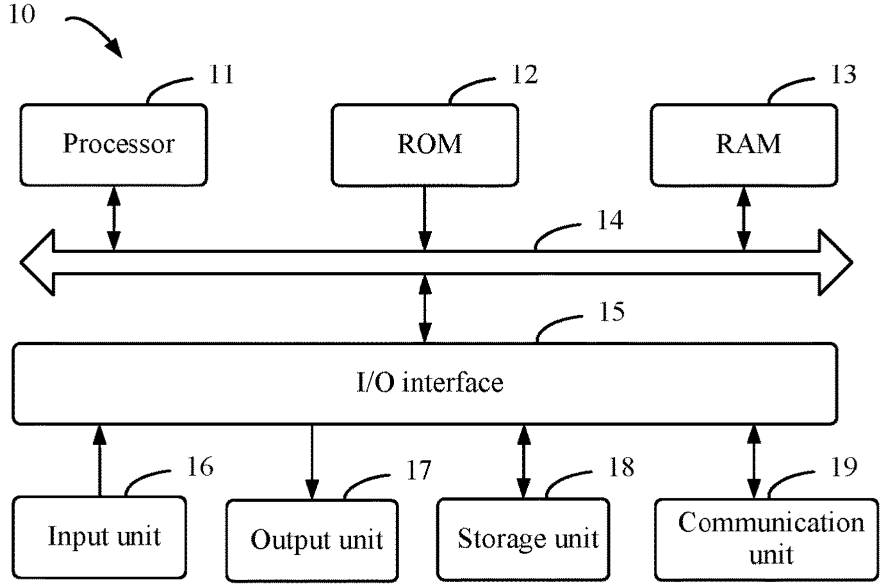
FIG. 12 is a structure diagram of an apparatus for adjusting a sidewall structure of a cylindrical light guide column according to an embodiment of the present disclosure.

FIG. 12 shows a structure diagram of an electronic device 10 capable of implementing the embodiments of the present disclosure. The electronic device is intended to represent various kinds of digital computers such as laptop computers, desktop computers, worktables, personal digital assistants, servers, blade servers, mainframe computers, and other suitable computers. The electronic device may further represent various kinds of mobile apparatuses, such as personal digital assistants, cellular telephones, smart phones, wearable devices (such as helmets, glasses, and watches), and other similar computing apparatuses. The components shown here, their connections and relationships, and their functions, are meant to be exemplary only, and are not meant to limit implementations of the present disclosure described and/or claimed here.

It is to be understood that the preceding adjustment method may be written into a processor 11 (or stored in a storage medium) by programming and then executed by the processor 11 in combination with the electronic device 10.

As shown in FIG. 12, the electronic device 10 includes at least one processor 11 and a memory that is communicatively connected to the at least one processor 11, such as a read-only memory (ROM) 12 and a random-access memory (RAM) 13. The memory stores a computer program that can be executed by the at least one processor. The processor 11 may perform various kinds of suitable actions and processing according to a computer program stored in the ROM 12 or a computer program loaded into the RAM 13 from a storage unit 18. In the RAM 13, various kinds of programs and data needed for operations of the electronic device 10 may also be stored. The processor 11, the ROM 12, and the RAM 13 are connected to each other via a bus 14. An input/output (I/O) interface 15 may also be connected to the bus 14.

Various components in the electronic device 10 may be connected to the I/O interface 150, including an input unit 16 such as a keyboard and a mouse, an output unit 17 such as various kinds of displays and a speaker, a storage unit 18 such as a magnetic disk and an optical disk, and a communication unit 19 such as a network card, a modem and a wireless communication transceiver. The communication unit 19 allows the electronic device 10 to exchange information/data with other devices via, for example, computer networks, such as the Internet, and/or various telecommunication networks.

The processor 11 may be various kinds of general and/or special-purpose processing components that have processing and computing capabilities. Examples of the processor 11 include, but are not limited to, a central processing unit (CPU), a graphics processing unit (GPU), various kinds of special-purpose artificial intelligence (AI) computing chips, various kinds of processors running machine learning model algorithms, a digital signal processor (DSP), and any suitable processors, controllers, microcontrollers, and the like. The processor 11 performs various methods and processing described above, such as a method for adjusting a sidewall structure of a cylindrical light guide column.

In some embodiments, the method for adjusting a sidewall structure of a cylindrical light guide column may be implemented as a computer program tangibly embodied on a computer-readable storage medium, for example, the storage unit 18. In some embodiments, all or a portion of the computer program may be loaded and/or installed in the electronic device 10 via the ROM 12 and/or the communication unit 19. When the computer program is loaded in the RAM 13 and executed by the processor 11, the computer program can perform one or more steps of the preceding method for adjusting a sidewall structure of a cylindrical light guide column. Alternatively, in other embodiments, the processor 11 may be configured in any other suitable manner (for example, by means of firmware) to perform the method for adjusting a sidewall structure of a cylindrical light guide column.

Various implementations of the systems and techniques described here can be realized in digital electronic circuitry, integrated circuitry, field-programmable gate arrays (FPGAs), application-specific integrated circuits (ASICs), system-on-a-chip systems (SOCs), complex programmable logic devices (CPLDs), computer hardware, firmware, software, and/or combinations thereof. These various implementations can include implementation in one or more computer programs that are executable and/or interpretable on a programmable system including at least one programmable processor, which may be special or general-purpose and configured to receive data and instructions from, and to transmit data and instructions to, a storage system, at least one input apparatus, and at least one output apparatus.

The computer programs for performing the method of the present disclosure may be written in any combination of one or more programming languages. These computer programs may be provided to a processor of a general-purpose computer, a special-purpose computer, or other programmable data processing apparatuses, such that the computer programs, when executed by the processor, cause the functions/operations specified in the flowcharts and/or block diagrams to be implemented. The computer programs may execute entirely on one machine, partly on the machine, as a stand-alone software package, partly on the machine and partly on a remote machine or entirely on the remote computer or server.

In the context of the present disclosure, a computer-readable storage medium may be any tangible medium that can contain, or store a computer program for use by or in connection with an instruction execution system, apparatus, or device. The computer-readable storage medium may be, but not limited to, an electronic, magnetic, optical, electromagnetic, infrared, or semiconductor system, apparatus, or device, or any suitable combination thereof. Alternatively, the computer-readable storage medium may be a machine-readable signal medium. Specific examples of the machine-readable signal medium include an electrical connection based on one or more wires, a portable computer disk, a hard disk, a RAM, a ROM, an erasable programmable read-only memory (EPROM) or a flash memory, an optical fiber, a portable compact disk read-only memory (CD-ROM), an optical memory device, a magnetic memory device, or any suitable combination thereof.

To provide for interaction with a user, the systems and techniques described here can be implemented on an electronic device having a display apparatus (for example, a cathode ray tube (CRT) or liquid crystal display (LCD) monitor) for displaying information to the user and a keyboard and a pointing apparatus (for example, a mouse or a trackball) by which the user can provide input to the electronic device. Other kinds of apparatuses can be used to provide for interaction with a user as well: for example, feedback provided to the user can be any form of sensory feedback (for example, visual feedback, auditory feedback, or tactile feedback); and input from the user can be received in any form, including acoustic, speech, or tactile input.

The systems and techniques described here can be implemented in a computing system that includes a back end component (for example, as a data server), or that includes a middleware component (for example, an application server), or that includes a front end component (for example, a client computer having a graphical user interface or a Web browser through which a user can interact with an implementation of the systems and techniques described here), or that includes any combination of such back end, middleware, or front end components. The components of the system can be interconnected by any form or medium of digital data communication (for example, a communication network). Examples of the communication network include a local area network (LAN), a wide area network (WAN), a blockchain network, and the Internet.

The computer system may include a client and a server. The client and the server are generally remote from each other and typically interact through a communication network. The relationship of the client and the server arises by virtue of computer programs running on the respective computers and having a client-server relationship with each other. The server may be a cloud server, also referred to as a cloud computing server or a cloud host. As a host product in a cloud computing service system, the server solves the defects of difficult management and poor service scalability in the service of a conventional physical host and a related VPS.

It is to be understood that various forms of processes shown above may be adopted with steps reordered, added or deleted. For example, the steps described in the present disclosure may be performed in parallel, sequentially or in different orders, as long as the desired results of the technical solutions of the present disclosure can be achieved, and no limitation is imposed herein.

The preceding embodiments do not limit the scope of the present disclosure. It is to be understood by those skilled in the art that various modifications, combinations, sub-combinations, and substitutions may be performed according to design requirements and other factors. Any modifications, equivalent substitutions, improvements and the like made within the spirit and principle of the present disclosure are within the scope of the present disclosure.

What is claimed is:

1. A method for configuring a sidewall of a cylindrical light guide column, comprising:

acquiring a size parameter of a light guide column, wherein the size parameter comprises: a light incident surface diameter, a light exit surface diameter, a light guide column height, a light guide column refractive index, and an incidence angle of an incident light;

calculating, based on a law of refraction, a total internal reflection angle of the light guide column according to the light guide column refractive index and an air refractive index, and calculating, in conjunction with the incidence angle of the incident light, a refraction angle of a refracted light that is refracted by a light incident surface of the light guide column;

determining a first inclination angle range of a sidewall of the light guide column according to the refraction angle and the total internal reflection angle;

determining, based on the refraction angle and the light incident surface diameter, a first position at which a marginal light of the light guide column is first incident on the sidewall of the light guide column after refracted by the light incident surface; and shaping, according to the first position, the sidewall of the light guide column, wherein in a case where a complementary angle of the refraction angle is less than the total internal reflection angle, shaping, according to the first position, the sidewall of the light guide column comprises:

forming a first inclination surface by adjusting, in a direction from the first position to a bottom surface of the light guide column, the sidewall of the light guide column according to the first inclination angle range, to enable the refracted light to be totally reflected on the first inclination surface;

wherein in a case where the complementary angle of the refraction angle is greater than or equal to the total internal reflection angle, shaping, according to the first position, the sidewall of the light guide column comprises:

forming a second inclination surface by adjusting, in the direction from the first position to the bottom surface of the light guide column, the sidewall of the light guide column according to a first included angle between a first connection line and the sidewall of the light guide column, to enable the refracted light to be totally reflected on the second inclination surface and hit a target light exit point, wherein the first connection line is formed by connecting the target light exit point of a light exit surface of the light guide column and the first position; and wherein after forming the first inclination surface by adjusting, in the direction from the first position to the bottom surface of the light guide column, the sidewall of the light guide column according to the first inclination angle range, the method further comprises:

determining, based on the refraction angle and the light incident surface diameter, a second position at which the marginal light of the light guide column is first incident on the first inclination surface after refracted by the light incident surface; and forming a third inclination surface by adjusting, in a direction from the second position to the bottom surface of the light guide column, the sidewall of the light guide column according to a second included angle between a second connection line and the first inclination surface, to enable the refracted light to be totally reflected on the third inclination surface and hit the target light exit point, wherein the second connection line is formed by connecting the target light exit point of the light exit surface of the light guide column and the second position.

2. The method for adjusting a sidewall structure of a cylindrical light guide column according to claim 1, wherein in the direction from the first position to the bottom surface of the light guide column, the method further comprises:

in a case where the first position is located above a middle height of the light guide column and is close to the light incident surface of the light guide column, adjusting, in a direction from the first position to the light incident surface of the light guide column, the sidewall of the light guide column by inclining the sidewall from the first position in a direction facing a center axis of the light guide column to form a circular table; and in a case where the first position is located below the middle height of the light guide column and is close to the light exit surface of the light guide column, adjusting, in a direction from the light incident surface to the first position of the light guide column, the sidewall of the light guide column by increasing a diameter of the light guide column in a direction away from the center axis of the light guide column.

3. The method for adjusting a sidewall structure of a cylindrical light guide column according to claim 1, wherein acquiring the first inclination angle range of the sidewall of the light guide column according to the refraction angle and the total internal reflection angle comprises:

acquiring the complementary angle of the refraction angle based on the refraction angle; and taking a difference between the complementary angle of the refraction angle and the total internal reflection angle as a minimum inclination angle in the first inclination angle range.

4. The method for configuring a sidewall of a cylindrical light guide column according to claim 1, wherein forming the second inclination surface by adjusting, in the direction from the first position to the bottom surface of the light guide column, the sidewall of the light guide column according to the first included angle between the first connection line and the sidewall of the light guide column comprises:

in a case where the first included angle is less than the refraction angle, determining a difference between the first included angle and the refraction angle as an inclination angle of the second inclination surface, and inclining the second inclination surface in a direction facing a center axis of the light guide column;

in a case where the first included angle is greater than the refraction angle, a complementary angle of the first included angle is greater than the total internal reflection angle and the complementary angle of the refraction angle is greater than the total internal reflection angle, determining a difference between the complementary angle of the refraction angle and the complementary angle of the first included angle as the inclination angle of the second inclination surface, and inclining the second inclination surface in a direction away from the center axis of the light guide column;

in a case where the first included angle is greater than the refraction angle, the complementary angle of the first included angle is less than the total internal reflection angle and the complementary angle of the refraction angle is greater than the total internal reflection angle, determining a difference between the complementary angle of the refraction angle and the total internal reflection angle as the inclination angle of the second inclination surface, and inclining the second inclination surface in the direction away from the center axis of the light guide column; or in a case where the first included angle is greater than the refraction angle, the complementary angle of the first included angle is less than the total internal reflection angle and the complementary angle of the refraction angle is equal to the total internal reflection angle or in a case where the first included angle is equal to the refraction angle, performing no adjustment.

5. The method for adjusting a sidewall structure of a cylindrical light guide column according to claim 1, wherein forming the third inclination surface by adjusting, in the direction from the second position to the bottom surface of the light guide column, the sidewall of the light guide column according to the second included angle between the second connection line and the first inclination surface comprises:

in a case where the second included angle is less than a complementary angle of a reflection angle of the refracted light on the first inclination surface and the reflection angle of the refracted light on the first inclination surface is greater than or equal to the total internal reflection angle, determining a difference between the complementary angle of the reflection angle of the refracted light on the first inclination surface and the second included angle as an inclination angle of the third inclination surface, and inclining the third inclination surface in a direction facing a center axis of the light guide column;

in a case where the second included angle is greater than the complementary angle of the reflection angle of the refracted light on the first inclination surface and less than a complementary angle of the total internal reflection angle and the reflection angle of the refracted light on the first inclination surface is greater than the total internal reflection angle, determining a difference between the reflection angle of the refracted light on the first inclination surface and the second included angle as the inclination angle of the third inclination surface, and inclining the third inclination surface in a direction away from the center axis of the light guide column;

in a case where the second included angle is greater than the complementary angle of the reflection angle of the refracted light on the first inclination surface and greater than the complementary angle of the total internal reflection angle and the reflection angle of the refracted light on the first inclination surface is greater than the total internal reflection angle, determining a difference between the reflection angle of the refracted light on the first inclination surface and the total internal reflection angle as the inclination angle of the third inclination surface, and inclining the third inclination surface in the direction away from the center axis of the light guide column; or in a case where the second included angle is greater than the complementary angle of the reflection angle of the refracted light on the first inclination surface and greater than or equal to the complementary angle of the total internal reflection angle and the reflection angle of the refracted light on the first inclination surface is equal to the total internal reflection angle or in a case where the second included angle is equal to the complementary angle of the reflection angle of the refracted light on the first inclination surface, performing no adjustment.

6. A light guide column, wherein the light guide column is based on a cylindrical light guide column comprising a light incident surface, a light exit surface and a sidewall, and the sidewall is adjusted based on the method for adjusting a sidewall structure of a cylindrical light guide column according to claim 1.

7. A device for configuring a sidewall of a cylindrical light guide column, comprising:

at least one processor;

a memory, which is configured to store at least one program;

wherein the at least one program, when executed by the at least one processor, causes the at least one processor to implement:

acquiring a size parameter of a light guide column, wherein the size parameter comprises: a light incident surface diameter, a light exit surface diameter, a light guide column height, a light guide column refractive index, and an incidence angle of an incident light;

calculating, based on a law of refraction, a total internal reflection angle of the light guide column according to the light guide column refractive index and an air refractive index, and calculating, in conjunction with the incidence angle of the incident light, a refraction angle of a refracted light that is refracted by a light incident surface of the light guide column;

determining a first inclination angle range of a sidewall of the light guide column according to the refraction angle and the total internal reflection angle;

determining, based on the refraction angle and the light incident surface diameter, a first position at which a marginal light of the light guide column is first incident on the sidewall of the light guide column after refracted by the light incident surface; and shaping, according to the first position, the sidewall of the light guide column, wherein in a case where a complementary angle of the refraction angle is less than the total internal reflection angle, the at least one program, when executed by the at least one processor, causes the at least one processor further to implement:

forming a first inclination surface by adjusting, in a direction from the first position to a bottom surface of the light guide column, the sidewall of the light guide column according to the first inclination angle range, to enable the refracted light to be totally reflected on the first inclination surface;

wherein in a case where the complementary angle of the refraction angle is greater than or equal to the total internal reflection angle, the at least one program, when executed by the at least one processor, causes the at least one processor further to implement:

forming a second inclination surface by adjusting, in the direction from the first position to the bottom surface of the light guide column, the sidewall of the light guide column according to a first included angle between a first connection line and the sidewall of the light guide column, to enable the refracted light to be totally reflected on the second inclination surface and hit a target light exit point, wherein the first connection line is formed by connecting the target light exit point of a light exit surface of the light guide column and the first position; and wherein the at least one program, when executed by the at least one processor, causes the at least one processor to further implement:

determining, based on the refraction angle and the light incident surface diameter, a second position at which the marginal light of the light guide column is first incident on the first inclination surface after refracted by the light incident surface; and forming a third inclination surface by adjusting, in a direction from the second position to the bottom surface of the light guide column, the sidewall of the light guide column according to a second included angle between a second connection line and the first inclination surface, to enable the refracted light to be totally reflected on the third inclination surface and hit the target light exit point, wherein the second connection line is formed by connecting the target light exit point of the light exit surface of the light guide column and the second position.

* * * * *